United States Patent
Nagai et al.

(10) Patent No.: US 11,267,425 B2
(45) Date of Patent: Mar. 8, 2022

(54) VEHICLE SEAT

(71) Applicant: Toyota Jidosha Kabushiki Kaisha, Toyota (JP)

(72) Inventors: Tetsuya Nagai, Okazaki (JP); Kohshi Katoh, Toyota (JP); Takashi Sugimoto, Anjyo (JP); Osamu Oda, Toyota (JP); Masatoshi Hada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/666,974

(22) Filed: Oct. 29, 2019

(65) Prior Publication Data

US 2020/0139916 A1     May 7, 2020

(30) Foreign Application Priority Data

Nov. 1, 2018    (JP) .............................. JP2018-206312

(51) Int. Cl.
| | |
|---|---|
| *B60N 2/22* | (2006.01) |
| *B60N 2/68* | (2006.01) |
| *B60N 2/64* | (2006.01) |
| *B60N 2/66* | (2006.01) |
| *B60N 2/39* | (2006.01) |
| *B60R 21/207* | (2006.01) |
| *B60N 2/70* | (2006.01) |
| *B60N 2/60* | (2006.01) |
| *B60N 2/58* | (2006.01) |
| *B60N 2/10* | (2006.01) |
| *B60N 2/02* | (2006.01) |

(52) U.S. Cl.
CPC .............. *B60R 21/207* (2013.01); *B60N 2/10* (2013.01); *B60N 2/68* (2013.01); *B60N 2/39* (2013.01); *B60N 2002/0212* (2013.01)

(58) Field of Classification Search
CPC ............ B60R 21/207; B60R 2021/161; B60R 2021/2076; B60R 2021/23146; B60N 2002/5808; B60N 2/68; B60N 2/4235; B60N 2/4228; B60N 2/42709; B60N 2/686; B60N 2/986
See application file for complete search history.

(56) References Cited

U.S. PATENT DOCUMENTS

| | | | | |
|---|---|---|---|---|
| 7,637,570 | B2* | 12/2009 | Becker ..................... | A47C 7/28 297/314 |
| 8,123,246 | B2* | 2/2012 | Gilbert .................. | B60R 21/217 280/728.2 |
| 8,807,594 | B2* | 8/2014 | Mizobata .............. | B60R 21/207 280/730.2 |
| 8,876,154 | B2* | 11/2014 | Tracht .................. | B60N 2/6009 280/730.2 |

(Continued)

FOREIGN PATENT DOCUMENTS

| | | |
|---|---|---|
| JP | 2011-201456 A | 10/2011 |
| JP | 2012-245825 A | 12/2012 |

(Continued)

*Primary Examiner* — Shin H Kim
(74) *Attorney, Agent, or Firm* — Dinsmore & Shohl LLP (57) ABSTRACT

A seatback subframe is swingable laterally of the vehicle with respect to a seatback main frame. A backrest is attached to the seatback subframe. Side airbag modules are attached to the seatback subframe at side edges.

4 Claims, 11 Drawing Sheets

(56) References Cited

U.S. PATENT DOCUMENTS

| | | | |
|---|---|---|---|
| 9,238,425 B2* | 1/2016 | Fukawatase | B60R 21/013 |
| 9,950,646 B2* | 4/2018 | Katoh | B60N 2/39 |
| 10,377,275 B2* | 8/2019 | Ketels | B60N 2/7094 |
| 10,710,479 B2* | 7/2020 | Ketels | B60N 2/501 |
| 10,926,733 B2* | 2/2021 | Dry | B60R 21/207 |
| 2004/0195882 A1* | 10/2004 | White | A47C 7/16 |
| | | | 297/284.3 |
| 2009/0102264 A1* | 4/2009 | Fischer | B60N 2/643 |
| | | | 297/354.1 |
| 2010/0244414 A1* | 9/2010 | Gilbert | B60R 21/217 |
| | | | 280/730.1 |
| 2011/0233980 A1 | 9/2011 | Hoshi | |
| 2012/0299342 A1* | 11/2012 | Mizobata | B60R 21/207 |
| | | | 297/216.1 |
| 2013/0257120 A1* | 10/2013 | Tracht | B60R 21/207 |
| | | | 297/216.13 |
| 2013/0320742 A1* | 12/2013 | Murolo | B60N 2/682 |
| | | | 297/452.18 |
| 2014/0001799 A1* | 1/2014 | Kalisz | B60N 2/914 |
| | | | 297/216.1 |
| 2014/0070595 A1* | 3/2014 | Taniguchi | B29C 37/0032 |
| | | | 297/452.59 |
| 2014/0300088 A1* | 10/2014 | Fukawatase | B60R 21/08 |
| | | | 280/729 |
| 2014/0312664 A1* | 10/2014 | Tanabe | B60N 2/5841 |
| | | | 297/216.13 |
| 2015/0266448 A1* | 9/2015 | Aoki | B60R 22/18 |
| | | | 297/313 |
| 2015/0307001 A1* | 10/2015 | Sahashi | B60N 2/5825 |
| | | | 297/218.2 |
| 2015/0367756 A1 | 12/2015 | Katoh et al. | |
| 2015/0375655 A1* | 12/2015 | Pluta | B60N 2/64 |
| | | | 297/452.18 |
| 2016/0129873 A1* | 5/2016 | Sahashi | B60R 21/207 |
| | | | 297/216.13 |
| 2016/0159254 A1* | 6/2016 | Katoh | B60N 2/66 |
| | | | 297/313 |
| 2018/0022238 A1 | 1/2018 | Gonzalez Uribe et al. | |
| 2018/0072187 A1 | 3/2018 | Katoh et al. | |

FOREIGN PATENT DOCUMENTS

| | | |
|---|---|---|
| JP | 2016-005938 A | 1/2016 |
| JP | 2018-016094 A | 2/2018 |
| JP | 2018-043671 A | 3/2018 |
| JP | 2018-070096 A | 5/2018 |

* cited by examiner

[PRIOR ART]

FIG. 11

VEHICLE SEAT

CROSS REFERENCE TO RELATED APPLICATION

This application claims priority to Japanese Patent Application No. 2018-206312 filed on Nov. 1, 2018, which is incorporated herein by reference in its entirety including the specification, claims, drawings, and abstract.

TECHNICAL FIELD

The present disclosure relates to a vehicle seat, in particular to a vehicle seat including a side airbag.

BACKGROUND

When a vehicle, for example, turns a corner, an inertial force is applied to an occupant in the vehicle. Known vehicle seats include seats and backrests that are swingable in response to such an inertial force. For example, the vehicle seat disclosed in JP 2018-16094A includes a fixed bottom frame and a seat frame that is swingable with respect to the bottom frame about a rotation axis extending longitudinally of the vehicle. This seat further includes an upper frame that is a backrest member coupled to and swingable with the seat frame.

A vehicle seat may include a side airbag to protect a driver or a passenger from a side impact in the event of a side collision of a vehicle. For example, in JP 2018-70096A, an airbag module is attached to a side frame that is a side member of a seatback frame of a vehicle seat. The airbag module includes an airbag, and an inflator that is a gas generator. The inflator is activated to supply gas into the airbag so that the airbag deploys (inflates) towards a side of an occupant.

Figure 11:
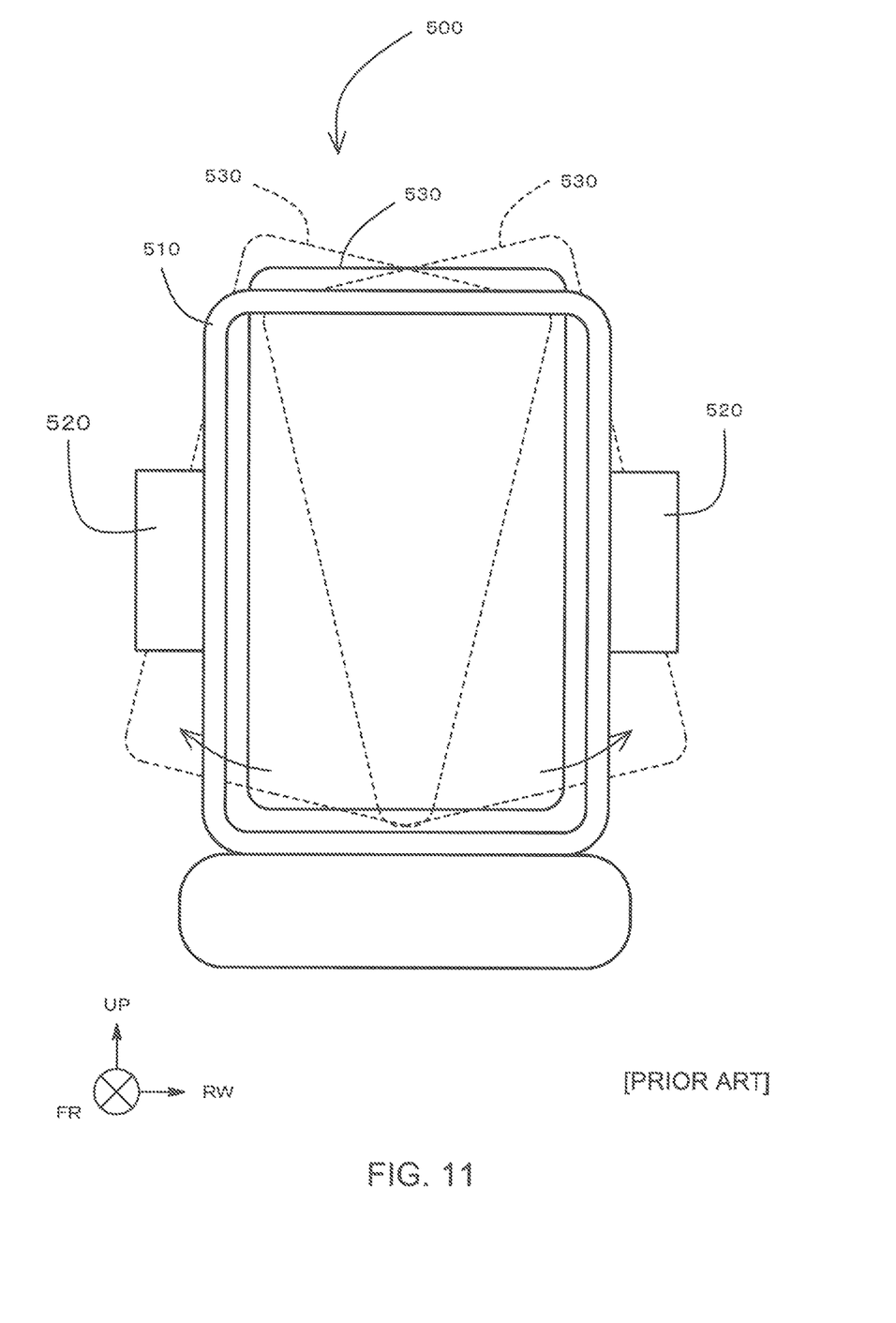
FIG. 11 shows a diagram used to describe a conventional vehicle seat structure.

In a vehicle seat with a swingable backrest as shown in FIG. 11, when a side airbag module 520 is attached to a fixed frame 510 of a seatback module 500, there is a risk that a deployment of the side airbag may be blocked by a swingable frame 530.

FIG. 11 illustrates a rear view of a vehicle seat. As shown in broken lines in FIG. 11, the swingable frame 530 swings laterally of the vehicle with respect to the fixed frame 510. Depending on a swing angle of the swingable frame 530 with respect to the fixed frame 510, the swingable frame 530 may pass in front of the side airbags module 520 as shown in broken lines such that deployment of the side airbags is blocked by the swingable frame 530.

An object of the present disclosure is to provide, in a vehicle seat with a swingable backrest, a vehicle seat with a side airbag that can reliably deploy to a side of an occupant.

SUMMARY

The present disclosure relates to a vehicle seat. The vehicle seat includes a seatback main frame and a seatback subframe. The seatback main frame is fixed to seat cushion frames and extends upwards. The seatback subframe is swingable laterally of the vehicle with respect to the seatback main frame. A backrest is attached to the seatback subframe. Side airbag modules are attached to the seatback subframe at side edges.

According to the above configuration, the side airbag modules are attached to the seatback subframe to which a backrest is attached. In this way, the side airbag can reliably deploy to a side of an occupant.

In the above disclosure, the seatback subframe may be positioned further towards a front of the vehicle than the seatback main frame. In this case, the seatback main frame may include airbag receiving portions behind the side airbag modules. The airbag receiving portions may extend laterally of the vehicle.

According to the above configuration, by providing the airbag receiving portions at the seatback main frame that is a fixed frame, the side airbag modules can be received by the airbag receiving portions during the deployment of the side airbags when the side airbags are pushed rearward of the vehicle by a reaction force.

In the above disclosure, the seatback subframe may include, at side edges, airbag brackets to which the side airbag modules are attached. In this case, each of the airbag brackets may include a side plate that extends laterally of the vehicle from the seatback subframe and a rear plate that extends rearwardly of the vehicle from a lateral end of the side plate. The side airbag modules are attached to the rear plates.

According to the above configuration, the side airbag modules are attached to the rear plates that extend towards the seatback main frame. In this way, the side airbag modules and the opposing airbag receiving portions of the seatback main frame are provided near each other. At the time of deployment of the side airbags, the side airbags are pushed rearward of the vehicle by a reaction force and received by the airbag receiving portions. Because the above configuration can restrict the rearward movement amount to a short distance, a sufficient amount of forward deployment of the airbags can be obtained.

In the above disclosure, when the seatback subframe is at a laterally neutral position with respect to the seatback main frame, the rear plate of each of the airbag bracket and the seatback main frame may be laterally spaced apart from each other.

According to the above configuration, the seatback subframe can swing laterally of the vehicle without being blocked by the airbag brackets.

Advantage of the Disclosure

According to the present disclosure, in a vehicle seat with a swingable backrest, a side airbag can reliably deploy to a side of an occupant.

BRIEF DESCRIPTION OF DRAWINGS

The present disclosure will be further described by reference to the accompanying drawings, wherein like reference numerals refer to like parts in several views, and wherein.

DESCRIPTION OF EMBODIMENTS

Figure 1:
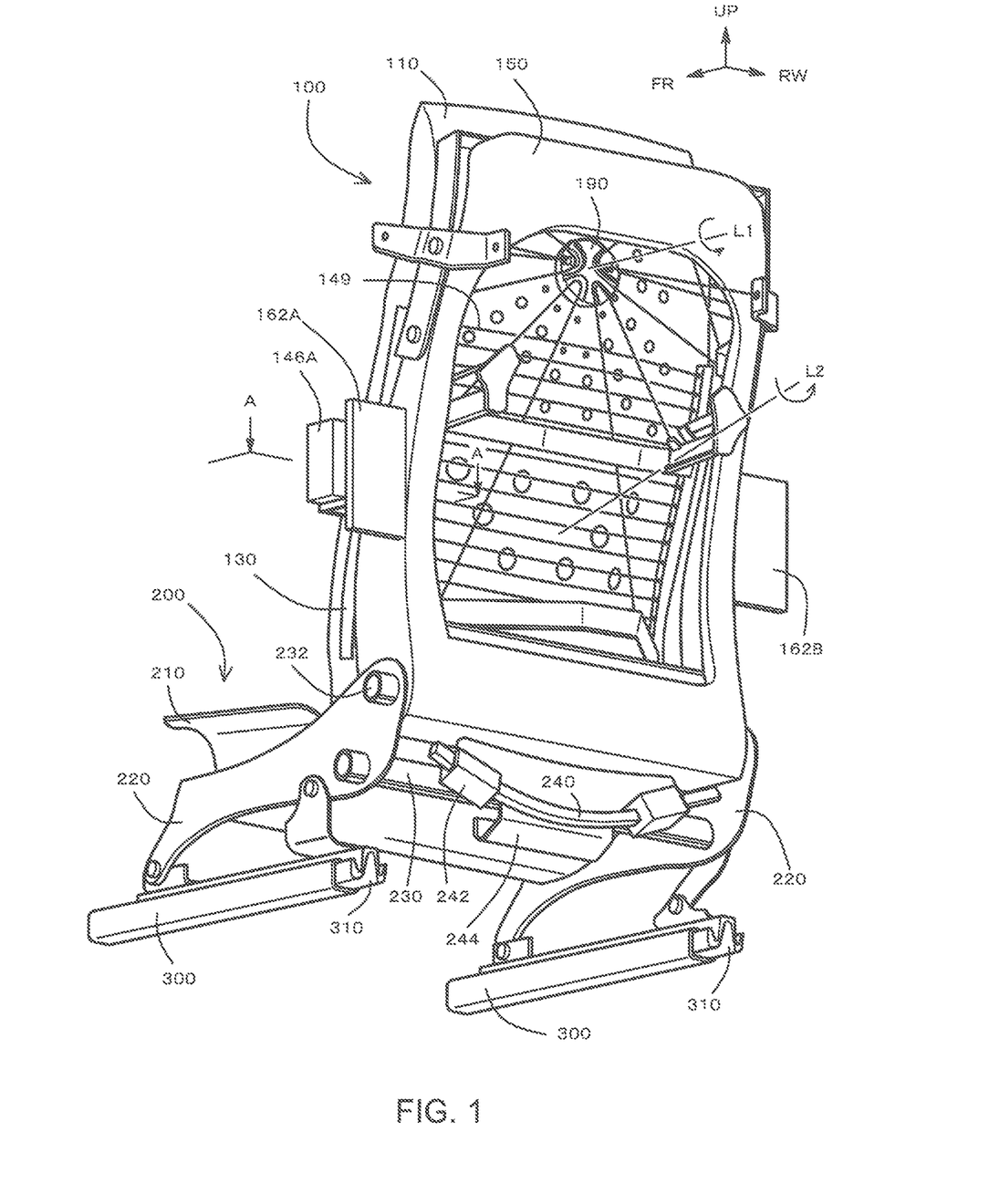
FIG. 1 exemplary shows a rear perspective view of a vehicle seat according to an embodiment of the present disclosure.

FIG. 1 is a rear perspective view of a vehicle seat according to an embodiment of the present disclosure. In FIGS. 1 to 10, a vehicle longitudinal direction is shown by an axis represented by a symbol "FR"; a lateral direction is shown by an axis represented by a symbol "RW", and a vertical direction is shown by an axis represented by a symbol "UP". The symbol "FR" abbreviates "front" and the front of the vehicle is assumed to be a positive side of the longitudinal axis FR. The up direction of the vehicle is assumed to be a positive side of the vertical axis.

The symbol "RW" abbreviates "right width". The right of the vehicle is assumed to be a positive side (laterally inner side of the vehicle) of the lateral axis, whereas the left of the vehicle is assumed to be a negative side (laterally outer side of the vehicle) of the lateral axis. Thus, the vehicle seat shown in FIGS. 1 to 10 is a front left seat. For a left-hand drive vehicle, this seat is a driver seat, whereas, for a right-hand drive vehicle, the seat is a front passenger seat. As shown in FIG. 1, the longitudinal axis (FR axis), the lateral axis (RW axis), and the vertical axis (UP axis) are orthogonal to each other.

As exemplary shown in FIG. 1, a vehicle seat according to the present embodiment is not a bench seat on which multiple occupants can be seated, but a separate seat on which a single occupant can be seated. The vehicle seat includes a seatback module 100 that is a backrest portion, and a seat cushion module 200 that is a seated portion.

A backrest 110 (refer to FIG. 2) of the seatback module 100 that may be in contact with an occupant's back and a seat cushion pan 210 on which the occupant may be seated are independently swingable (swingingly movable) with respect to a vehicle floor. Based on such kinetic characteristics of the backrest portion and the seated portion, the vehicle seat according to the present embodiment may be referred to as a "kinetic seat".

Seat Cushion Module Structure

By reference to FIG. 1, the seat cushion pan 210 is swingable along an arched shape of a curved rail 240. For example, the seat cushion pan 210 is swingable about an imaginary line L2 exemplary shown in FIG. 1.

The curved rail 240 is fixed to a seat rod 230 with a fastening member (not shown). Both ends of the seat rod 230 are fixed to seat cushion frames 220. The seat cushion frames 220 are fixed frames for the seat cushion pan 210. Bottom portions of the seat cushion frames 220 are fixed to seat rail guides 310.

The seat rail guides 310 are inserted into channels of seat rails 300. As the seat rails 300 extend longitudinally of the vehicle, the seat rail guides 310 are movable longitudinally of the vehicle accordingly.

The curved rail 240 pierces through two or more curved rail guides 242 such that the curved rail guides 242 are movable along the curved rail 240. The seat cushion pan 210 is fixed to the curved rail guides 242 via a cushion bracket 244.

Another swingable mechanism (not shown) that is swingable about the same swing axis as the curved rail guides 242 is provided at the front of the seat cushion pan 210. Thus, the front and rear edges of the seat cushion pan 210 are both supported by the swingable mechanisms.

Having the above structure, the seat cushion pan 210 is swingable about the imaginary line L2 with respect to the fixed seat cushion frames 220.

Seatback Module Structure

Figure 2:
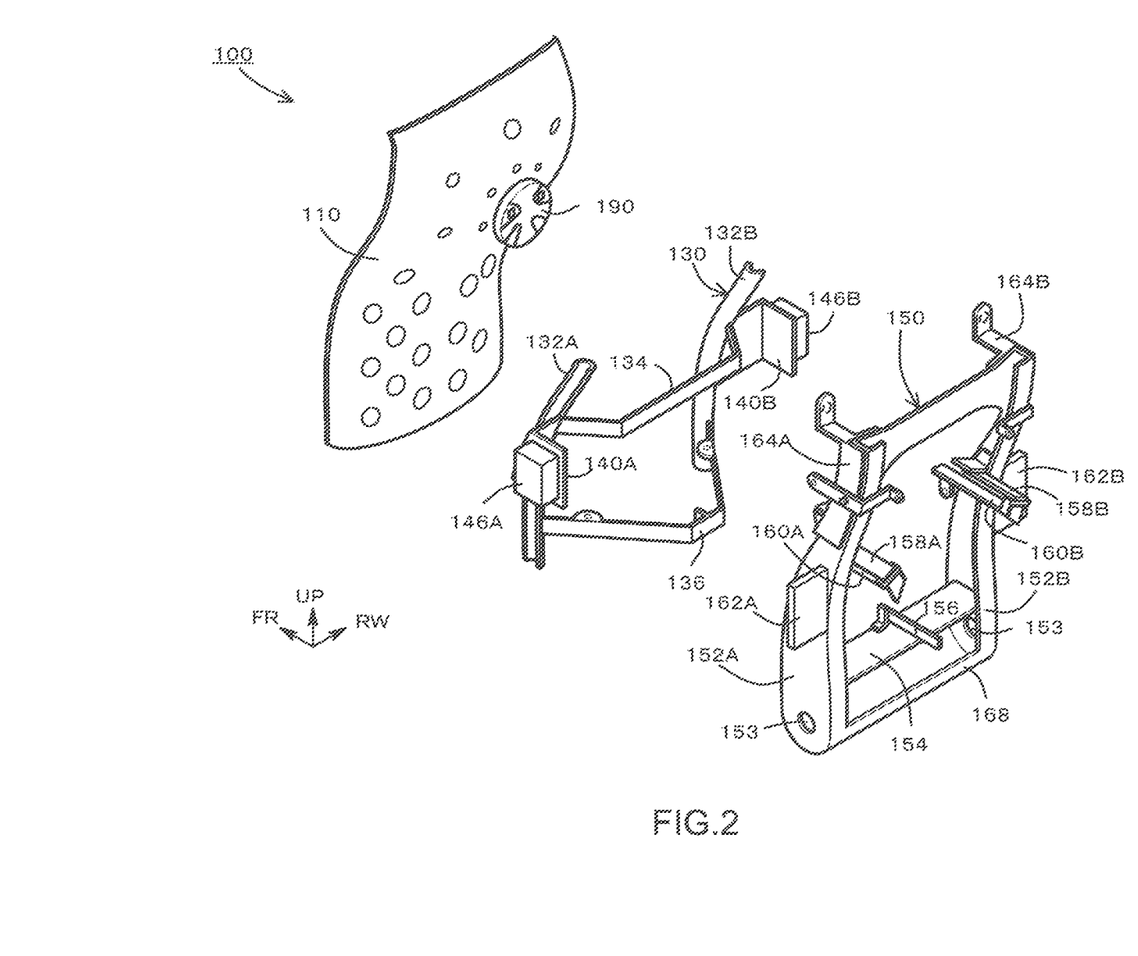
FIG. 2 exemplary shows an exploded perspective view of elements included in a seatback module of a vehicle seat according to an embodiment of the present disclosure.

FIG. 2 exemplary shows an exploded perspective view of main elements of the seatback module 100. The seatback module 100 includes the backrest 110, a seatback subframe 130, and a seatback main frame 150. As described further below, the backrest 110 is attached to the seatback subframe 130. The backrest 110 and the seatback subframe 130 are unitedly swingable laterally of the vehicle with respect to the seatback main frame 150. Specifically, by reference to FIG. 1, the backrest 110 and the seatback subframe 130 are swingable laterally of the vehicle with respect to the seatback main frame 150 about an imaginary line L1 that extends longitudinally of the vehicle through a holder ornament 190.

As seen in FIG. 2, the backrest 110 is a rest portion for an occupant's back and is made from, for example, a resin. As a whole, the backrest 110 has a so-called "bucket style" in which the backrest 110 is shaped to be concaved rearwards around the center to hold an occupant's back. The backrest 110 also has a shape such that an upper portion for supporting the occupant's thoracic spine is concaved further rearward than a lower portion for supporting the occupant's lumbar spine.

The backrest 110 is made from an elastic resin to be elastically deformable in response to a load applied longitudinally of the vehicle. As described further below, the rear surface of the backrest 110 is supported by cross wires 149 (refer to FIG. 1). Accordingly, the deformable distance of the backrest 110 along the longitudinal axis of the vehicle is determined by the elasticity of the backrest 110 itself and the elasticity of the cross wires 149.

Figure 6:
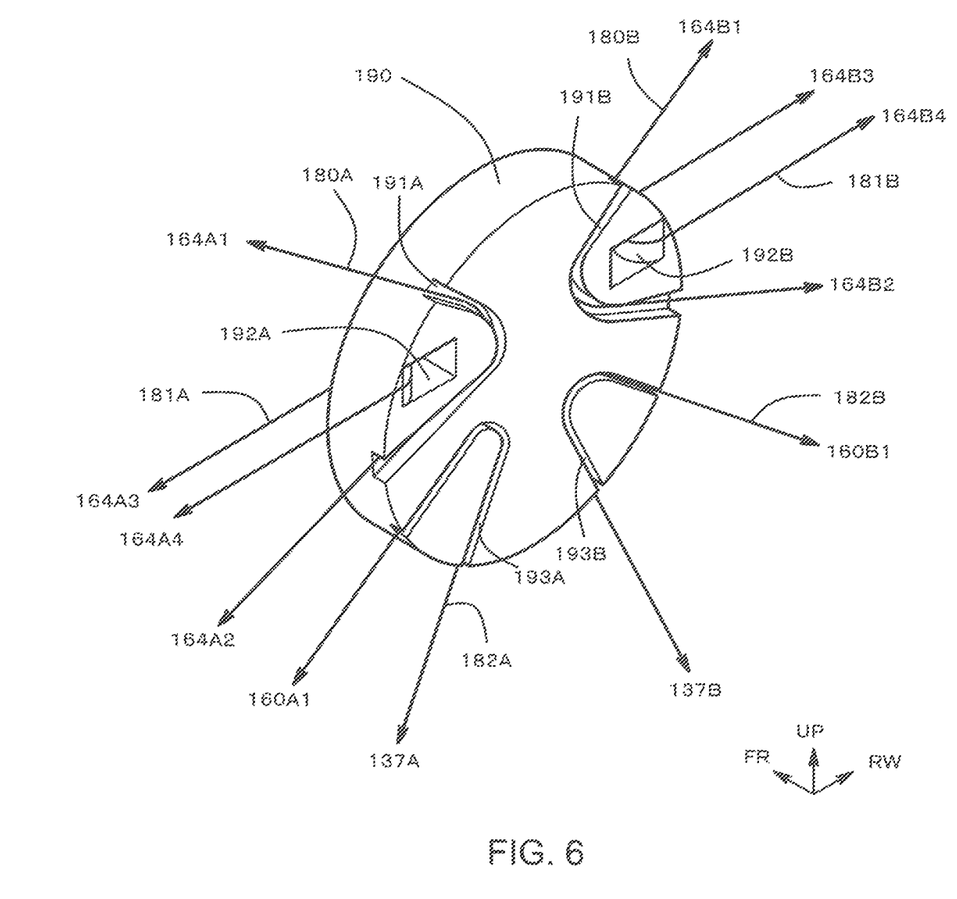
FIG. 6 exemplary shows a perspective view of a holder ornament and nested wires that are hooked through the holder ornament.

The holder ornament 190 is disposed at an upper portion of the backrest 110. As shown in FIGS. 1 and 6, the holder ornament 190 is used to hook (hang) nested wires 180 to 182 that are laid out in a shape of a spider web. The backrest 110 is supported by the seatback main frame 150 via the holder ornament 190 and the nested wires 180 to 182.

The seatback subframe 130 is a frame swingable laterally of the vehicle with respect to the seatback main frame 150 that is a fixed frame. The seatback subframe 130 includes a pair of sub side frames 132A, 132B, a subframe upper cross member 134, and a subframe lower cross member 136.

The sub side frames 132A, 132B extend vertically of the vehicle (along the UP axis) at both sides. The subframe upper cross member 134 and the subframe lower cross member 136 extend laterally of the vehicle to connect the sub side frames 132A, 132B respectively at upper and lower portions. The sub side frames 132A, 132B, the subframe upper cross member 134, and the subframe lower cross member 136 are frame members of the seatback subframe 130 and made of a metal material, such as aluminum or steel, to provide rigidity sufficient to support the occupant's weight.

Side airbag modules 146A, 146B are attached to the seatback subframe 130 respectively at side edges. Specifically, airbag brackets 140A, 140B are provided respectively at the sub side frames 132A, 132B such that the airbag brackets 140A, 140B respectively protrude laterally from the sub side frames 132A, 132B. The side airbag modules 146A, 146B are respectively provided on the airbag brackets 140A, 140B. The structures of the airbag brackets 140A, 140B and the side airbag modules 146A, 146B are described in detail below.

The sub side frames 132A, 132B are fixed to both side edges of the backrest 110 using adhesive or fasteners, such as bolts and nuts. Thus, the sub side frames 132A, 132B are shaped along both side edges of the backrest 110.

The cross wires 149 (refer to FIG. 1) that extend laterally of the vehicle are stretched to connect the sub side frames 132A, 132B. Multiple cross wires 149 are vertically spaced apart from each other at a certain interval. The cross wires 149 support the rear surface of the backrest 110. Specifically, when the backrest 110 is bended rearwards, the cross wires 149 receive the backrest 110. Accordingly, the amount of the bend of the backrest 110 is controlled.

The subframe upper cross member 134 and the subframe lower cross member 136 both extend laterally of the vehicle to connect the sub side frames 132A, 132B. Each of the subframe upper cross member 134 and the subframe lower cross member 136 provided below has a Π (pi) shape in a plan view such that the subframe upper and lower cross members 134, 136 extend towards the rear of the vehicle on both sides and further extend laterally of the vehicle therebetween. The subframe lower cross member 136 extends further rearward than the subframe upper cross member 134.

As described further below, front ends of L-shaped brackets 160A, 160B (refer to FIG. 3) are attached to the subframe upper cross member 134. At a lateral center, the subframe lower cross member 136 includes a leaf spring fixing portion 148 that extends longitudinally of the vehicle. A rear end of a leaf spring 156 is fixed to the leaf spring fixing portion 148.

The subframe lower cross member 136 further includes a pair of wire holders 137A, 137B. The wire holders 137A, 137B respectively hold (fasten) one ends of nested wires 182A, 182B exemplary shown in FIG. 6.

Figure 3:
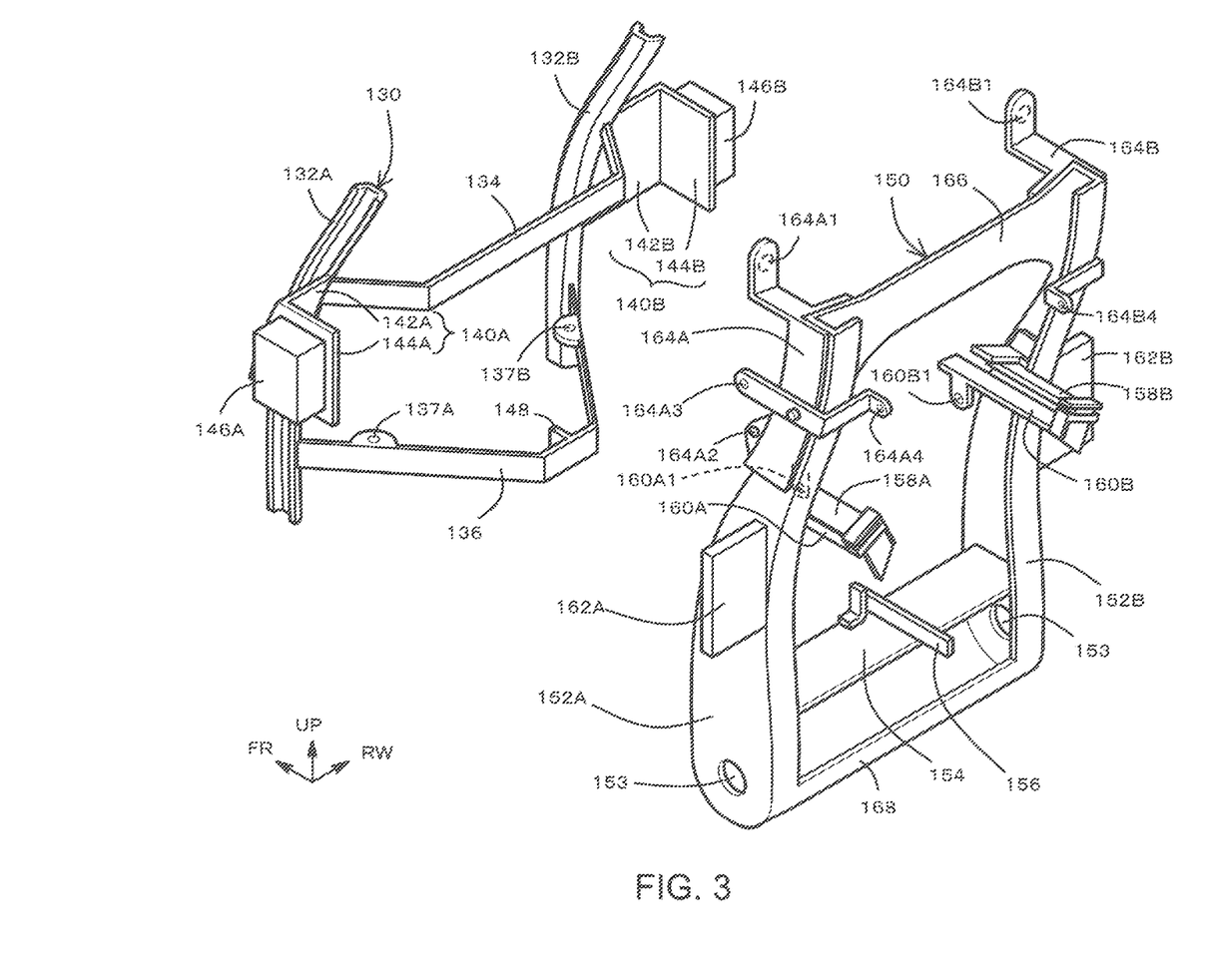
FIG. 3 exemplary shows a perspective view showing a seatback main frame and a seatback subframe shown in the exploded perspective view in FIG. 2.

The seatback main frame 150 is a fixed frame that is fixed to the seat cushion frames 220 via a seat pipe 232 (refer to FIG. 1) and extends upwards. As shown in FIG. 3, the seatback main frame 150 includes main side frames 152A, 152B, a main cross plate 154, a main frame upper cross member 166, and a main frame lower cross member 168, all of which are frame members. These members are rigid members made from a metal material, such as aluminum or steel.

The main side frames 152A, 152B extend vertically of the vehicle and respectively provided at both sides. Each of the main side frames 152A, 152B includes, at a lower end, a through hole 153 through which the seat pipe 232 (refer to FIG. 1) is inserted.

The main side frames 152A, 152B are shaped along, for example, the sub side frames 132A, 132B of the seatback subframe 130. The main side frames 152A, 152B are connected between upper ends via the main frame upper cross member 166, whereas the main side frames 152A, 152B are connected between lower ends via the main cross plate 154 and the main frame lower cross member 168.

Airbag receiving portions 162A, 162B are attached to the main side frames 152A, 152B. The airbag receiving portions 162A, 162B protrude laterally from the main side frames 152A, 152B. For example, the airbag receiving portion 162A protrudes laterally outward (towards the negative side of the RW axis) from the main side frame 152A, whereas the airbag receiving portion 162B protrudes laterally inward (towards the positive side of the RW axis).

The airbag receiving portions 162A, 162B may be unitedly formed with, for example, the main side frames 152A, 152B. Alternatively, the airbag receiving portions 162A, 162B may be plates separately provided from the main side frames 152A, 152B and attached to the main side frames 152A, 152B by welding or other connection methods. The structures of the side airbags including the airbag receiving portions 162A, 162B are described further below.

Front ends of leaf springs 158A, 158B are fixed to the main side frames 152A, 152B. A front end of the leaf spring 156 is fixed to the main cross plate 154.

Figure 4:
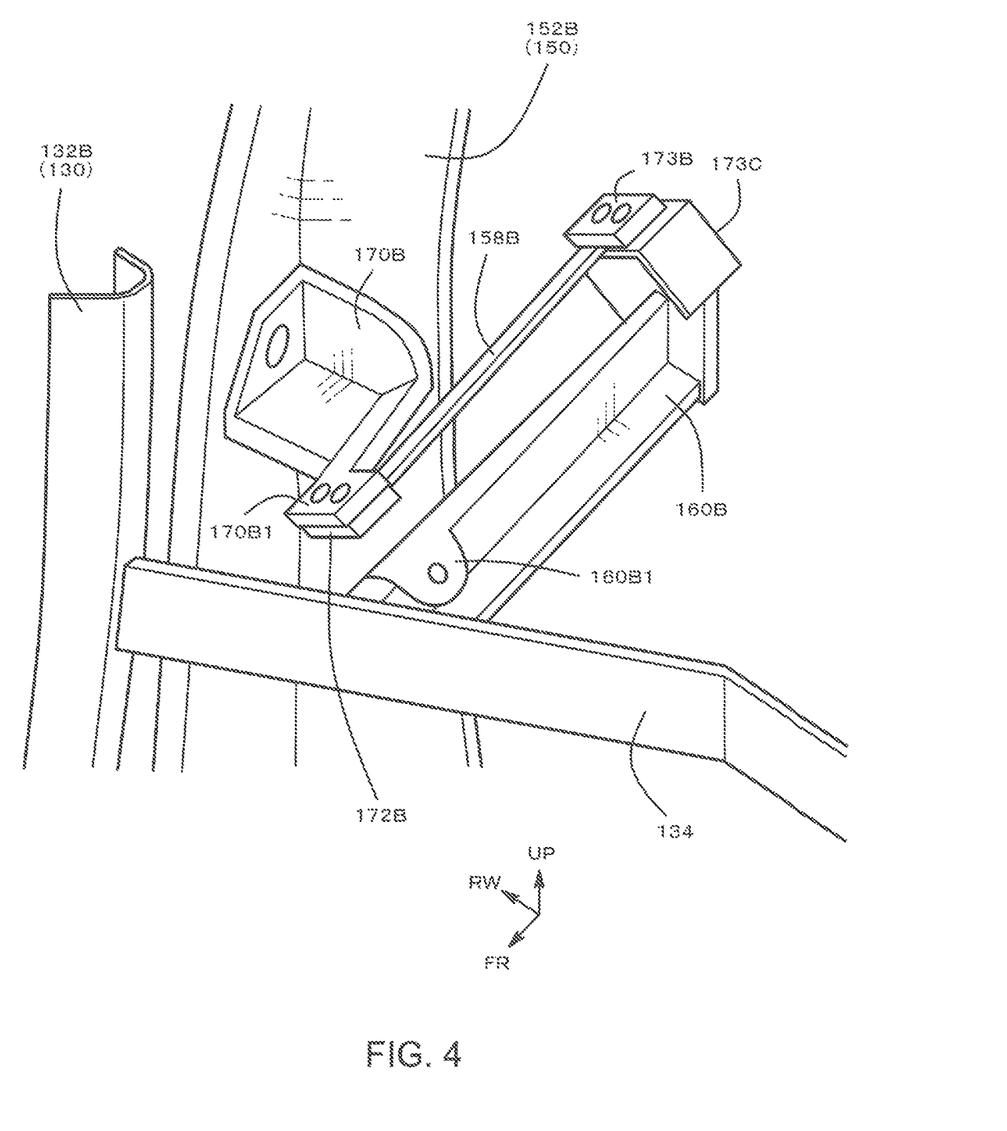
FIG. 4 exemplary shows a perspective view of a structure around a leaf spring of a vehicle seat according to an embodiment of the present disclosure.

FIG. 4 exemplary shows the structure around the leaf spring 158B. Because the vehicle seat has a symmetric structure, the structure around the leaf spring 158A is symmetrically identical. Accordingly, the description of the leaf spring 158B can be understood to also describe the leaf spring 158A by replacing the suffix "B" after the reference numeral with "A".

By reference to FIG. 4, a fixing bracket 170B is fixed to the main side frame 152B. The fixing bracket 170B includes a spring holding portion 170B 1 that extends towards the front of the vehicle. The front end of the leaf spring 158B is clamped between the spring holding portion 170B1 and another spring holding portion 172B.

The leaf spring 158B extends longitudinally of the vehicle and the rear end of the leaf spring 158B is clamped between spring holding portions 173B, 173C. The leaf spring 158B is disposed so that a plate surface is directed laterally inward and downward of the vehicle seat.

The spring holding portion 173C is coupled to the rear end of the L-shaped bracket 160B. The L-shaped bracket 160B has an L-shaped cross section in the front view (along the RW-UP plane) in order to prevent twist about the longitudinal axis of the L-shaped bracket 160B. The L-shaped bracket 160B extends longitudinally of the vehicle in parallel to the leaf spring 158B such that the L-shaped bracket 160B is laterally spaced apart from the leaf spring 158B. The front end of the L-shaped bracket 160B is fixed to the rear surface of the subframe upper cross member 134.

Figure 5:
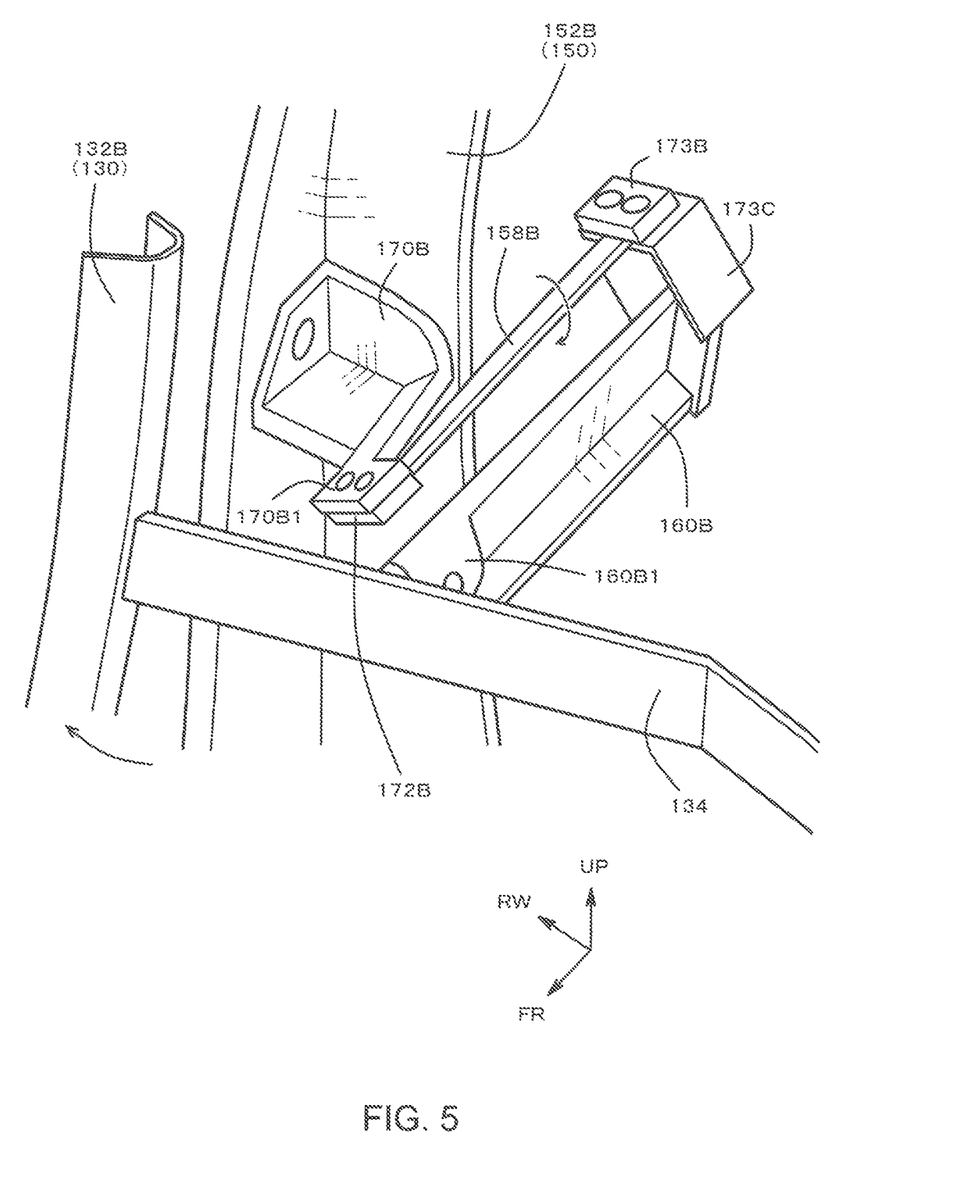
FIG. 5 exemplary shows a perspective view during swing of a seatback subframe.

FIG. 5 exemplary shows the leaf spring 158B when twisted. The leaf spring 158B is twisted about the longitudinal axis of the leaf spring 158B (that is, about the longitudinal axis of the vehicle). On this occasion, the seatback subframe 130 and the seatback main frame 150 that are connected via the leaf spring 158B move relative to each other.

As seen in FIG. 3, the seatback subframe 130 is supported by the seatback main frame 150 via the three leaf springs 156, 158A, 158B. The seatback subframe 130 is swingable with respect to the seatback main frame 150 because these three leaf springs 156, 158A, 158B can be twisted.

The seatback main frame 150 also supports the backrest 110 (refer to FIG. 2) via the nested wires 180 to 182 (refer to FIG. 6). The holder ornament 190 is disposed behind the backrest 110. The holder ornament 190 may have, for example, a cylindrical disc shape, whose diameter is longer than the height of the cylinder axis.

Multiple channels are formed in the rear surface (exposed surface) of the holder ornament 190. These channels serve as hooks for the nested wires 180 to 182. As shown in FIG. 6, the holder ornament 190 includes upper hooks 191A, 191B, middle hooks 192A, 192B, and lower hooks 193A, 193B.

The upper hooks 191A, 191B are U-shaped channels disposed in upper portions of the holder ornament 190. When viewing the rear surface of the holder ornament 190, the channel of the upper hook 191A extends to pass through in an 8 o'clock direction and a 10 o'clock direction of the holder ornament 190. Similarly, the channel of the upper hook 191B extends to pass through in a 2 o'clock direction and a 4 o'clock direction of the holder ornament 190.

The lower hooks 193A, 193B are U-shaped channels disposed in lower portions of the holder ornament 190. When viewing the rear surface of the holder ornament 190, the channel of the lower hook 193A extends to pass through in a direction between a 7 o'clock direction and the 8 o'clock direction and in a direction between a 6 o'clock direction and the 7 o'clock direction. Similarly, the channel of the lower hook 193B extends to pass through in a direction between the 4 o'clock direction and a 5 o'clock direction and in a direction between the 5 o'clock direction and the 6 o'clock direction of the holder ornament 190.

Unlike the upper hooks 191A, 191B and the lower hooks 193A, 193B, the middle hooks 192A, 192B are through holes along the thickness of the holder ornament 190.

The nested wires 180A, 181A, 182A, 180B, 181B, 182B pass through the hooks. The nested wire 180A is hooked at the upper hook 191A. One end of the nested wire 180A is fixed to a wire holding portion 164A1 (refer to FIG. 3) of a wire bracket 164A that is fixed to the seatback main frame 150. The other end of the nested wire 180A is fixed to a wire holding portion 164A2 of the wire bracket 164A.

The nested wire 181A passes through the middle hook 192A. One end of the nested wire 181A is fixed to a wire holding portion 164A3 of the wire bracket 164A, whereas the other end is fixed to a wire holding portion 164A4. The nested wire 182A is hooked at the lower hook 193A. One end of the nested wire 182A is fixed to a wire holding portion 160A1 of the L-shaped bracket 160A. The other end of the nested wire 182A is fixed to the wire holder 137A of the subframe lower cross member 136.

As shown in FIGS. 1 and 6, the nested wires 180A, 181A, 182A and the nested wires 180B, 181B, 182B are laid out symmetrically. Accordingly, the above description of the nested wires 180A, 182A, 182A can be understood to also describe the nested wires 180B, 181B, and 182B by replacing the suffix "A" after the reference numerals with "B".

As described above, the six (three pairs of) wires (nested wires 180A, 180B, 181A, 181B, 182A, 182B) are laid out in a shape of a spider web from the holder ornament 190 at the center. These wires are fixed to the seatback main frame 150 except for the one ends of the nested wires 182A, 182B. In other words, the backrest 110 and the seatback subframe 130 that is fixed to the backrest 110 are supported by the seatback main frame 150 via the nested wires 180A, 180B, 181A, 181B, 182A, 182B.

It should be noted here that each of the nested wires is swingable with respect to the respective hook of the holder ornament 190. In this way, when the seatback subframe 130 and the backrest 110 are relatively moved laterally of the vehicle with respect to the seatback main frame 150 due to twist of the leaf springs 158A, 158B, 156 (Refer to FIG. 3) as described above, each of the nested wires 180A, 180B, 181A, 181B, 182A, 182B swings with respect to the respective hook 191A, 191B, 192A, 192B, 193A, 193B of the holder ornament 190 to follow the relative movement.

It should be noted here that although each nested wire can swing the respective hook, the lengths of the nested wires are not variable beyond elastic ranges. In other words, stretchable lengths of the nested wires are limited. Accordingly, for example, when the seatback subframe 130 and the backrest 110 are to be moved laterally of the vehicle with respect to the seatback main frame 150, the relative position between the holder ornament 190 and the seatback main frame 150 is not changed beyond the stretchable lengths of the wires. For example, by reference to FIG. 6, when the backrest 110 is to be moved laterally inwards (towards the right of the RW axis), the movement is limited mainly by the nested wires 180A, 181A.

The holder ornament 190 is the rotation center (swing center) of the swing of the seatback subframe 130 and the backrest 110 along the lateral axis of the vehicle with respect to the seatback main frame 150. Specifically, as exemplary shown in FIG. 1, the seatback subframe 130 and the backrest 110 are swingable laterally of the vehicle with respect to the seatback main frame 150 about the imaginary line L1 that extends longitudinally of the vehicle passing through the holder ornament 190.

In the above swing aspect, because the holder ornament 190 is provided at an upper position of the seatback module 100, the swing amount (swing width) for the occupant is larger on the lumbar spine side than on the cervical spine side that is at the center of the swing. In other words, because the kinetic energy from the inertial force or vibrations transmitted to the occupant from the vehicle is absorbed by a swinging movement (pendulum movement) around the lumbar spine, the kinetic energy transmitted to the cervical spine side is reduced. As a result, because vibrations of the cervical spine during driving decrease, blurring of vision is reduced (vision is stabled).

Side Airbag Structure

Figure 7:
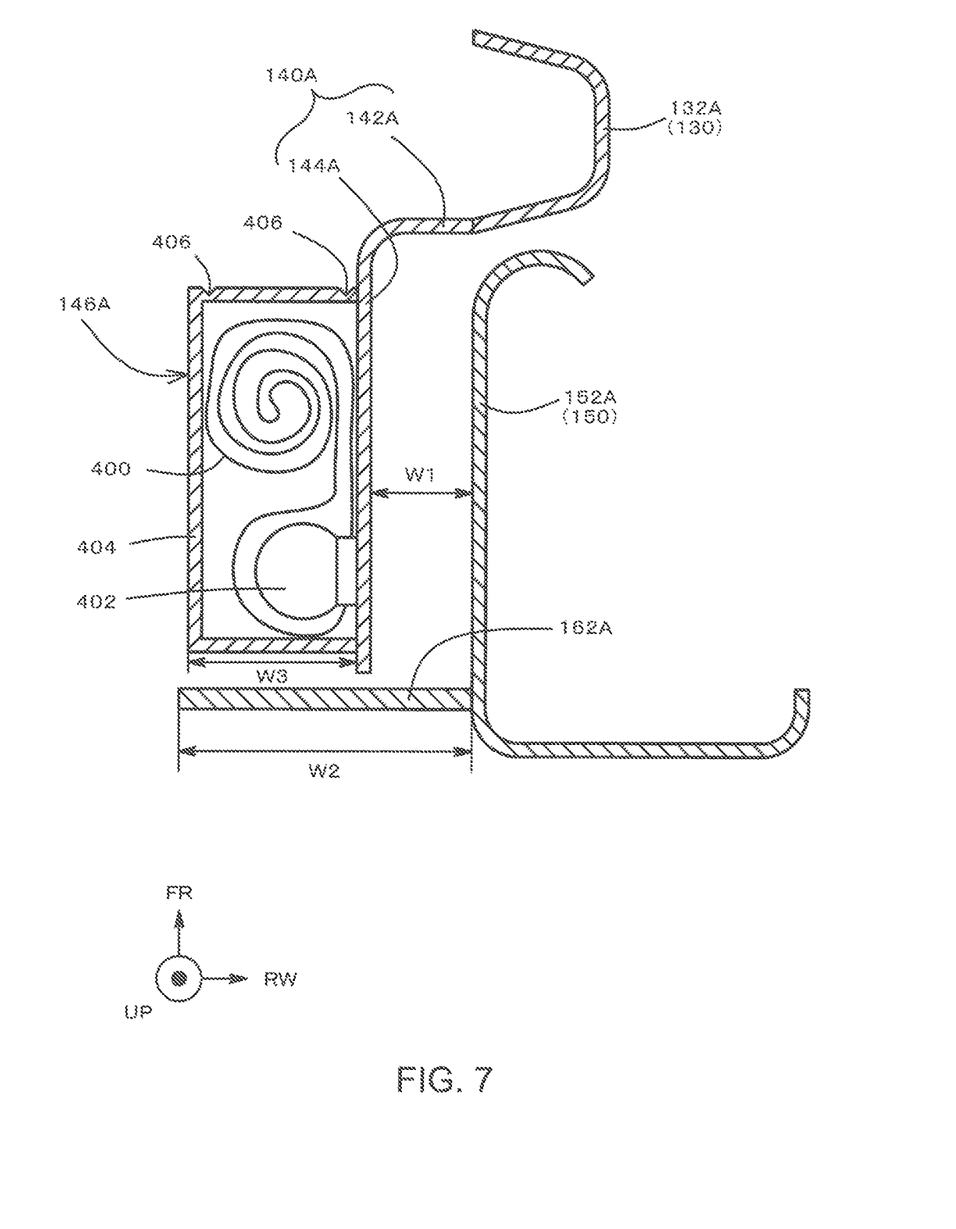
FIG. 7 shows a cross sectional view taken along line A-A in FIG. 1.
Figure 8:
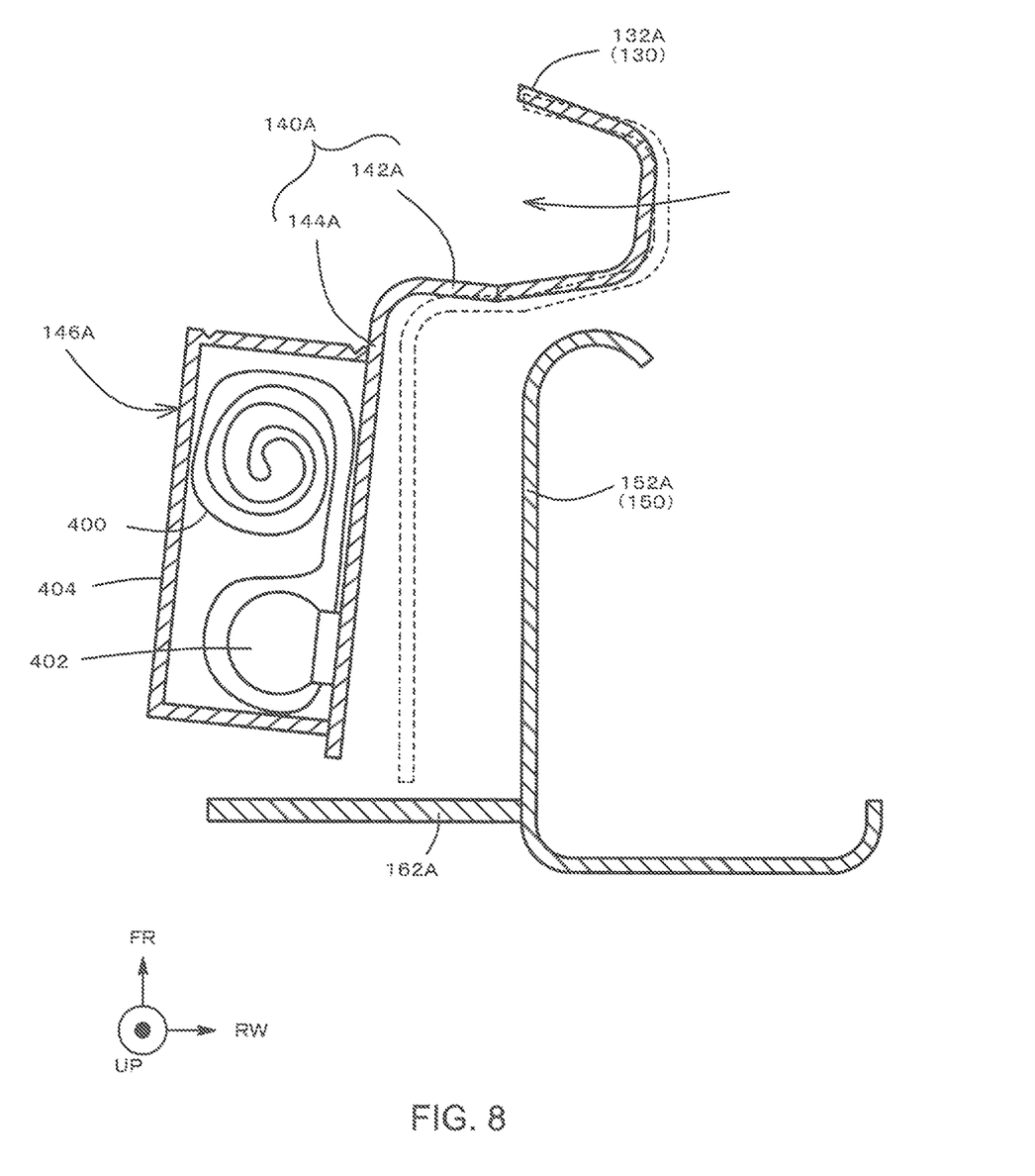
FIG. 8 shows a cross sectional view taken along line A-A in FIG. 1 when a seatback subframe swings to the left.

FIG. 7 exemplary shows a cross section taken along line A-A in FIG. 1. Although FIG. 7 shows the cross sectional structure on the left side of the vehicle, because of the symmetric structure of the vehicle seat, the right side of the vehicle also has the symmetrically identical cross sectional structure. For example, the structure of the right side of the vehicle can also be understood by replacing the suffix "A" with "B" in the description below.

As shown in FIG. 7, the sub side frame 132A of the seatback subframe 130 is disposed further towards the front of the vehicle than the main side frame 152A of the seatback main frame 150. The side airbag module 146A is disposed on the sub side frame 132A that is disposed further towards the front of the vehicle, whereas the airbag receiving portion 162A is disposed on the main side frame 152A that is disposed further towards the rear of the vehicle.

As shown in FIG. 7, the side airbag module 146A includes a side airbag 400, an inflator 402, and a casing 404. The casing 404 is a box-shaped enclosure that encloses the inflator 402 and the side airbag 400.

A front wall of the casing 404 that is positioned towards the front of the vehicle includes at least one fragile portion 406 at which the wall is thinner than peripheral portions. When the side airbag 400 deploys, the side airbag 400 deploys towards the front of the vehicle by breaking the casing 404 at the fragile portion 406.

The inflator 402 is a gas generator. For example, in response to a deployment command from an ECU (controller) of the vehicle, a propellant inside the inflator 402 ignites. In this way, nitrogen gas is generated to cause immediate deployment of the airbag. The inflator 402 is positioned further towards the rear of the vehicle than the side airbag 400.

The side airbag 400 is enclosed in the casing 404, for example, in a wound state. When gas is supplied from the inflator 402, the side airbag 400 breaks the casing 404 and deploys (inflates) towards the front of the vehicle. Specifically, the side airbag 400 deploys such that the side airbag 400 spreads out further towards the front of the vehicle than the backrest 110.

As seen by reference to FIG. 1, in the event of a side collision of a vehicle, the side airbag module 146A protects an occupant from a side. Specifically, the side airbag module 146A is disposed such that the side airbag 400 (refer to FIG. 7) deploys on the side of the occupant's chest. For example, the side airbag module 146A is disposed on the sub side frame 132A at a position slightly lower than the vertical center.

As described above, the sub side frame 132A is fixed to and swings unitedly with the backrest 110 against which the occupant may lean. In this way, when the side airbag 400 deploys from the side airbag module 146A, the side airbag 400 can deploy to the side of the occupant without interference by other parts.

As shown in FIG. 7, the side airbag module 146A is attached to the sub side frame 132A via the airbag bracket 140A. The airbag bracket 140A allows the seatback subframe 130 to swing with respect to the seatback main frame 150, while allowing the side airbag module 146A to be positioned on a side of the seatback main frame 150.

The airbag bracket 140A is disposed at a side edge of the seatback subframe 130 (that is, at a side edge of the sub side frame 132A). The airbag bracket 140A includes a side plate 142A and a rear plate 144A. The airbag bracket 140A has an L-shaped cross section taken along line A-A.

The side plate 142A laterally protrudes further from the side edge (outer edge) of the sub side frame 132A. The rear plate 144A extends rearwardly of the vehicle from a lateral end (laterally outer end portion) of the side plate 142A. The side airbag module 146A is attached to the rear plate 144A. In other words, the side airbag module 146A is attached to the seatback subframe 130 on a side.

The rear plate 144A extends further towards the rear of the vehicle than the sub side frame 132A. In this way, the side airbag module 146A attached to the rear plate 144A is disposed near to the airbag receiving portion 162A. As described further below, the side airbag module 146A is pushed rearward when the side airbag 400 deploys. On this occasion, the rearward movement amount of the side airbag module 146A can be reduced by disposing the side airbag module 146A near the airbag receiving portion 162A.

For example, the rear plate 144A is disposed laterally next to the main side frame 152A of the seatback main frame 150. Because the side plate 142A extends laterally of the vehicle, the rear plate 144A and the main side frame 152A of the seatback main frame 150 are laterally spaced apart from each other.

A gap distance W1 between the rear plate 144A and the main side frame 152A of the seatback main frame 150 that are laterally spaced apart from each other represents a gap distance when the seatback subframe 130 is at a laterally neutral position with respect to the seatback main frame 150. The neutral position represents a position of the seatback subframe 130 with respect to the seatback main frame 150 when no load is applied to the vehicle seat and the leaf springs 156, 158A, 158B are not twisted but are in a flat state. The seatback subframe 130 swings from the neutral position to the left (FIG. 8) or the right (FIG. 9) laterally of the vehicle with respect to the seatback main frame 150.

Figure 9:
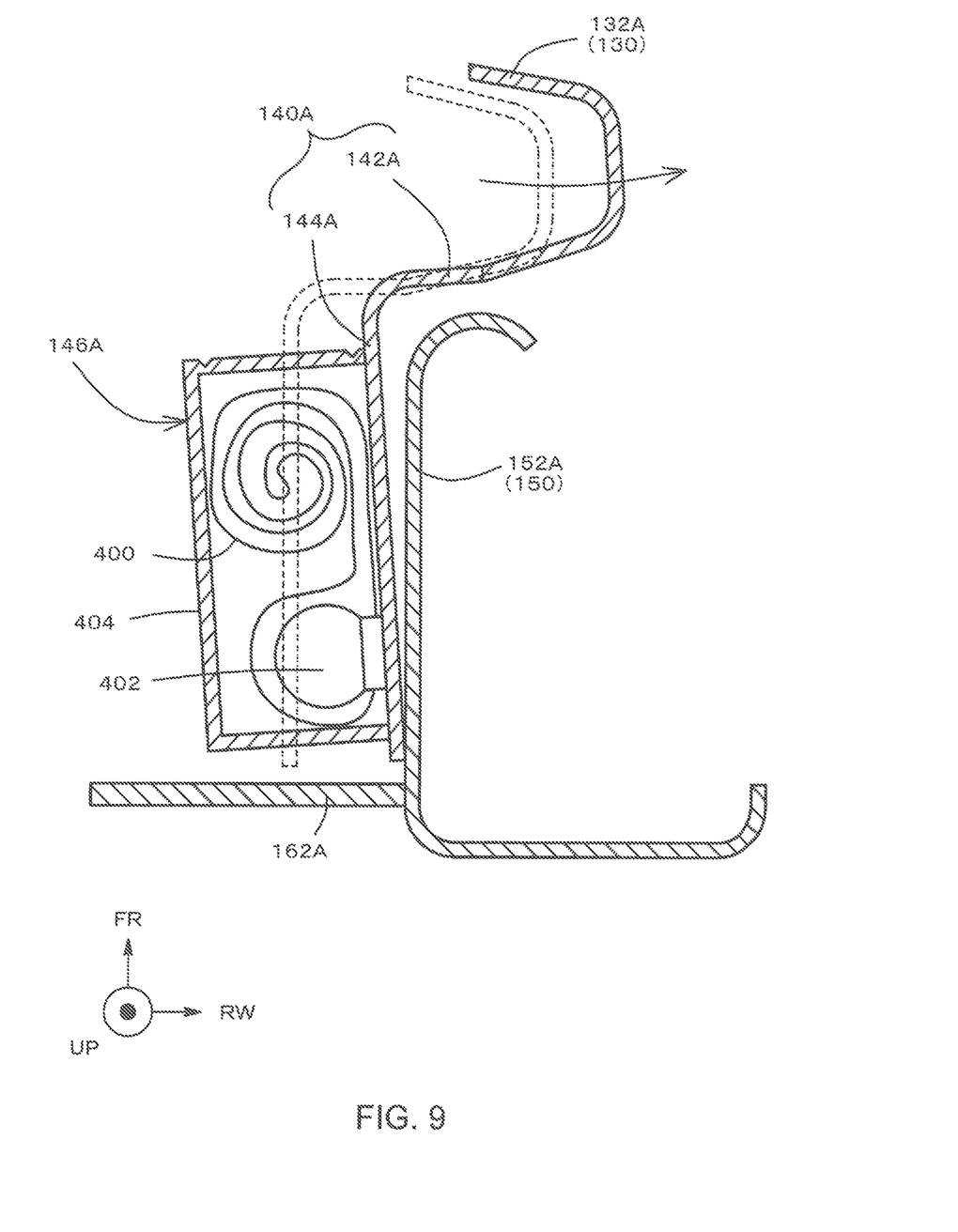
FIG. 9 shows a cross sectional view taken along line A-A in FIG. 1 when the seatback subframe swings to the right.
Figure 10:
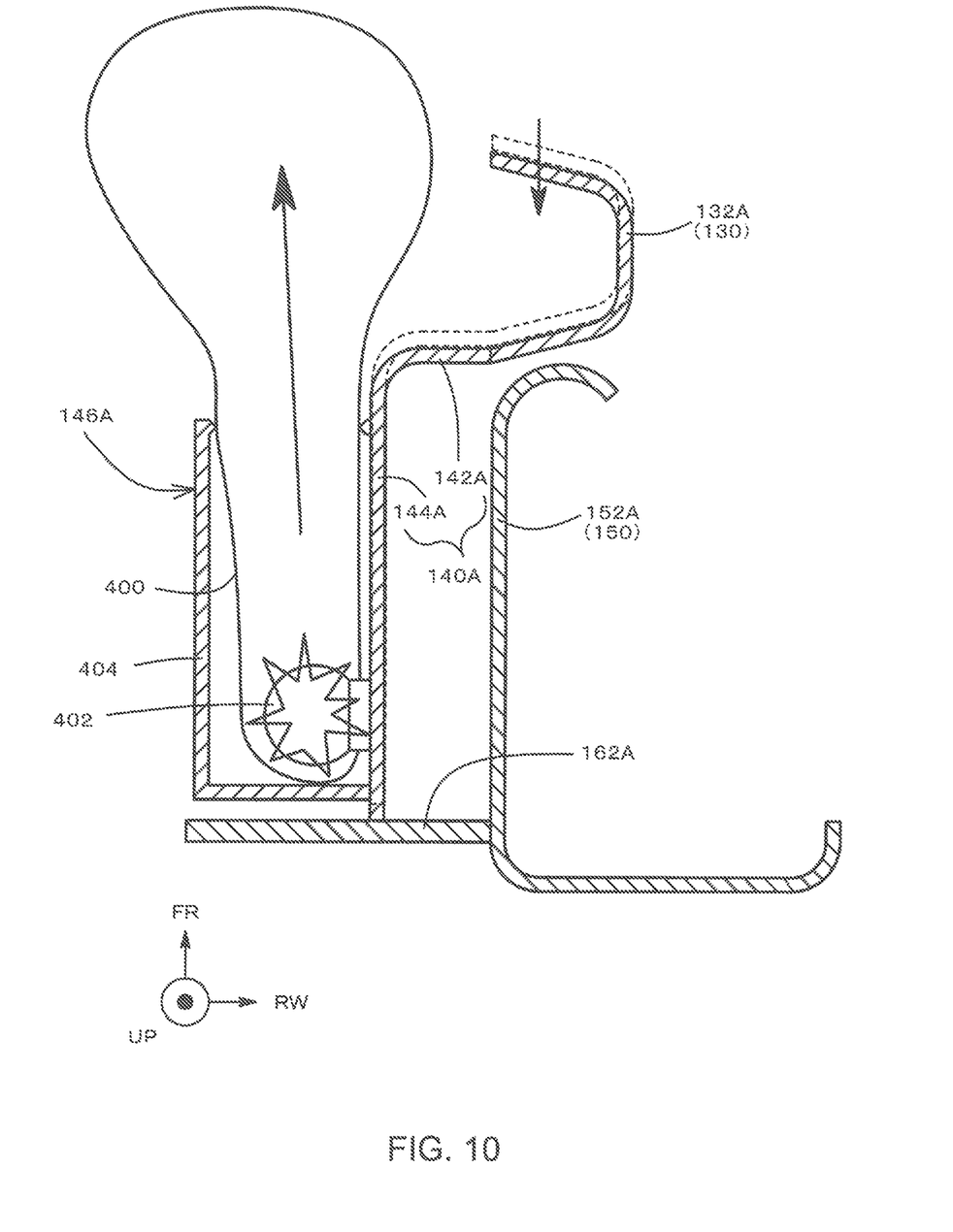
FIG. 10 exemplary shows a cross sectional view taken along line A-A in FIG. 1 during deployment of the side airbag.

In particular, as exemplary shown in FIG. 9, the gap distance W1 allows the sub side frame 132A to swing towards the main side frame 152A from the neutral position (FIG. 7). The gap distance W1 may be determined based on the swing width of the seatback subframe 130 with respect to the seatback main frame 150.

As shown in FIG. 7, the airbag receiving portion 162A is disposed at a side edge of the seatback main frame 150 (that is, a side edge of the main side frame 152A). The airbag receiving portion 162A protrudes laterally outward from the side edge of the main side frame 152A. The airbag receiving portion 162A is disposed behind the side airbag module 146A.

The airbag receiving portion 162A may be unitedly formed with the main side frame 152A. Alternatively, the airbag receiving portion 162A may be a plate that is welded to the main side frame 152A.

The airbag receiving portion 162A is a wall member for receiving the side airbag module 146A. As exemplary shown in FIG. 10, when the side airbag 400 deploys, the side airbag module 146A and the seatback subframe 130 are pushed rearward by a reaction force. On this occasion, the airbag receiving portion 162A receives the side airbag module 146A and the airbag bracket 140A that move rearward to thereby inhibit a further movement. As a result, a sufficient amount of forward deployment of the side airbag 400 can be obtained.

The airbag receiving portion 162A is configured to be able to receive the side airbag module 146A regardless of a swinging position of the seatback subframe 130. For example, the width W2 (refer to FIG. 7) of the airbag receiving portion 162A along the lateral axis of the vehicle is determined so as to receive the side airbag module 146A even when the side airbag module 146A is at a leftmost position (FIG. 8) or the rightmost position (FIG. 9).

For example, the width W2 of the airbag receiving portion 162A along the lateral axis of the vehicle is determined to be longer than the sum of the gap distance W1 between the rear plate 144A and the side edge of the main side frame 152A at the neutral position (FIG. 7) and the width W3 (along the lateral axis of the vehicle) of the casing 404 of the side airbag module 146A (W2>W1+W3). Such a configuration allows the airbag receiving portion 162A to receive the side airbag module 146A regardless of the swinging position of the seatback subframe 130.

The present disclosure is not limited to the embodiments described above. The present disclosure includes all possible changes and modifications that do not depart from the technical scope and sprit of the present disclosure defined in the claims.

The invention claimed is:

1. A vehicle seat comprising:
    a seatback main frame fixed to seat cushion frames and extending upwards; and
    a seatback subframe swingable laterally of a vehicle with respect to the seatback main frame, a backrest being attached to the seatback subframe, the seatback subframe positioned further towards a front of the vehicle than the seatback main frame, the seatback subframe comprising, at side edges, airbag brackets to which the side airbag modules are attached, each of the airbag brackets comprising:
        a side plate that extends laterally of the vehicle from the seatback subframe, and
        a rear plate to which the side airbag module is attached, the rear plate extends rearwardly of the vehicle from a lateral end of the side plate;
    wherein side airbag modules are attached to the seatback subframe at side edges, wherein the seatback main frame comprises airbag receiving portions behind the side airbag modules, the airbag receiving portions extending laterally of the vehicle.

2. The vehicle seat according to claim 1, wherein when the seatback subframe is at a laterally neutral position with respect to the seatback main frame, the rear plate of each of the airbag brackets and the seatback main frame are laterally spaced apart from each other.

3. A vehicle seat comprising:

a seatback main frame fixed to seat cushion frames and extending upwards; and a seatback subframe swingable laterally of a vehicle with respect to the seatback main frame, a backrest being attached to the seatback subframe, wherein:

side airbag modules are attached to the seatback subframe at side edges, the seatback subframe comprises, at side edges, airbag brackets to which the side airbag modules are attached, and each of the airbag brackets comprises
- a side plate that extends laterally of the vehicle from the seatback subframe, and
- a rear plate that extends rearwardly of the vehicle from a lateral end of the side plate, the rear plate to which the side airbag module is attached.

4. The vehicle seat according to claim 3, wherein when the seatback subframe is at a laterally neutral position with respect to the seatback main frame, the rear plate of each of the airbag brackets and the seatback main frame are laterally spaced apart from each other.

* * * * *